US011630587B2

(12) United States Patent
Kwon

(10) Patent No.: US 11,630,587 B2
(45) Date of Patent: Apr. 18, 2023

(54) STORAGE DEVICE AND A DATA BACKUP METHOD THEREOF

(71) Applicant: SAMSUNG ELECTRONICS CO., LTD., Suwon-si (KR)

(72) Inventor: Changsik Kwon, Suwon-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 64 days.

(21) Appl. No.: 17/016,901

(22) Filed: Sep. 10, 2020

(65) Prior Publication Data

US 2021/0165581 A1    Jun. 3, 2021

(30) Foreign Application Priority Data

Dec. 3, 2019    (KR) .......................... 10-2019-0158696

(51) Int. Cl.
*G06F 3/06*    (2006.01)
*G06F 1/04*    (2006.01)
*G06F 11/14*    (2006.01)

(52) U.S. Cl.
CPC .............. *G06F 3/0619* (2013.01); *G06F 1/04* (2013.01); *G06F 3/0625* (2013.01); *G06F 3/0653* (2013.01); *G06F 3/0656* (2013.01); *G06F 3/0659* (2013.01); *G06F 3/0679* (2013.01); *G06F 11/1451* (2013.01); *G06F 11/1461* (2013.01); *G06F 11/1469* (2013.01)

(58) Field of Classification Search
CPC .. G06F 11/1461; G06F 3/0656; G06F 3/0653; G06F 1/04; G06F 3/0625; G06F 3/0634; G06F 3/0679; G06F 11/1451; G06F 11/1469; G06F 1/3275; G06F 3/0619; G06F 3/0659; G06F 11/2015; Y02D 10/00; Y02D 30/50
USPC .................................................. 711/162, 161
See application file for complete search history.

(56) References Cited

U.S. PATENT DOCUMENTS

| | | | |
|---|---|---|---|
| 9,042,197 | B2 | 5/2015 | Allison et al. |
| 9,454,319 | B2 | 9/2016 | Stenfort |
| 10,094,887 | B2 | 10/2018 | Lee et al. |
| 10,139,884 | B2 | 11/2018 | Pardoe |

(Continued)

FOREIGN PATENT DOCUMENTS

| | | |
|---|---|---|
| JP | H05-011895 A | 1/1993 |
| JP | 4135510 | 8/2008 |
| KR | 10-2001-0038651 | 5/2001 |

*Primary Examiner* — David Yi
*Assistant Examiner* — Zubair Ahmed
(74) *Attorney, Agent, or Firm* — F. Chau & Associates, LLC

(57) ABSTRACT

A data backup method of a storage device which includes a storage controller, a buffer memory, and a plurality of nonvolatile memory devices, the method including: detecting a power-off event of an external power provided to the storage device; deactivating a host interface of the storage controller in response to the detection of the power-off event; moving data stored in the buffer memory to a static random access memory (SRAM) in the storage controller; blocking or deactivating a power of the buffer memory; setting an interleaving mode of the plurality of nonvolatile memory devices to a minimum power mode; and programming the data moved to the SRAM to at least one of the plurality of nonvolatile memory devices.

10 Claims, 13 Drawing Sheets

(56) References Cited

U.S. PATENT DOCUMENTS

| | | | | |
|---|---|---|---|---|
| 2001/0003206 A1* | 6/2001 | Pole | ............... | G06F 1/3203 |
| | | | | 713/320 |
| 2005/0055498 A1* | 3/2005 | Beckert | ............ | G06F 1/3275 |
| | | | | 713/340 |
| 2008/0307240 A1* | 12/2008 | Dahan | ............ | G06F 1/324 |
| | | | | 713/320 |
| 2017/0047124 A1* | 2/2017 | Ellis | ............... | G06F 3/0688 |
| 2017/0185335 A1* | 6/2017 | Pardoe | ............ | G06F 1/3296 |
| 2017/0315889 A1 | 11/2017 | Delaney et al. | | |
| 2019/0079125 A1 | 3/2019 | Abrahams et al. | | |
| 2019/0162797 A1 | 5/2019 | An et al. | | |
| 2019/0354475 A1* | 11/2019 | Choi | ............ | G06F 12/0238 |

\* cited by examiner

FIG. 8

Interleaving unit

| PW mode | Activated Way | Notation |
|---|---|---|
| Normal mode | 32 Way | Full power |
| Backup mode | 8 Way | Minimum power |

STORAGE DEVICE AND A DATA BACKUP METHOD THEREOF

CROSS-REFERENCE TO RELATED APPLICATION

This application claims priority under 35 U.S.C. § 119 to Korean Patent Application No. 10-2019-0158696 filed on Dec. 3, 2019, in the Korean Intellectual Property Office, the disclosure of which is incorporated by reference herein in its entirety.

TECHNICAL FIELD

Exemplary embodiments of the inventive concept relate to a semiconductor memory device, and in particular, to a storage device and a data backup method thereof.

DISCUSSION OF RELATED ART

A storage device may be a device that stores data under control of a host device, such as a computer, a smartphone, or a smart pad. The storage device may be a hard disk drive (HDD), a solid state drive (SSD), a memory card, etc. In general, the HDD uses a magnetic disk as a storage medium and the SSD uses a semiconductor memory as a storage medium.

The storage device may be driven by an external power source. The storage device may lose data when the external power source fails or is powered-off. Accordingly, an auxiliary power supply may be included in the storage device. However, when the external power source is powered-off, data of the storage device may be backed up using only the limited energy from the auxiliary power source.

In this case if there is a mishap during a backup operation, the data may not be completely backed-up using a power from the auxiliary power source. This may affect the reliability of the backed-up data. In addition, this may be exacerbated in a situation where the amount of data to be backed-up increases as the capacity or performance of the storage device increases. Accordingly, an efficient backup management policy may be needed to secure the reliability of data in a backup operation of the high-capacity and high-performance storage device.

SUMMARY

According to an exemplary embodiment of the inventive concept, there is provided a data backup method of a storage device which includes a storage controller, a buffer memory, and a plurality of nonvolatile memory devices, the method including: detecting a power-off event of an external power provided to the storage device; deactivating a host interface of the storage controller in response to the detection of the power-off event; moving data stored in the buffer memory to a static random access memory (SRAM) in the storage controller; blocking or deactivating a power of the buffer memory; setting an interleaving mode of the plurality of nonvolatile memory devices to a minimum power mode; and programming the data moved to the SRAM to at least one of the plurality of nonvolatile memory devices.

According to an exemplary embodiment of the inventive concept, there is provided a storage device which includes an auxiliary power supply, the storage device further including: a power loss prevention circuit for monitoring an external power to detect a power-off event, generating a power-off detection signal when the power-off event is detected, and selecting the auxiliary power supply as a device power when the power-off event is detected; a plurality of nonvolatile memory devices provided in the storage device; a buffer memory for temporarily storing data exchanged between the plurality of nonvolatile memory devices and a host; and a storage controller, wherein, in response to the power-off detection signal, the storage controller moves data stored in the buffer memory and then programs the data moved from the buffer memory to at least one of the plurality of nonvolatile memory devices, and wherein the storage controller deactivates a host interface and then blocks or deactivates a power of the buffer memory after the data has been moved from the buffer memory.

According to an exemplary embodiment of the inventive concept, there is provided a data backup method of a storage device which performs data backup by using an auxiliary power supply when a power-off event occurs, the method including: deactivating a host interface of a storage controller in response to the power-off event; setting a nonvolatile memory device to an interleaving mode, which consumes a minimum power, from among a plurality of interleaving modes for accessing the nonvolatile memory device; and programming backup data stored in a buffer memory to the nonvolatile memory device depending on the set interleaving mode.

According to an exemplary embodiment of the inventive concept, there is provided a data backup method of a storage device which includes a storage controller, first and second memories, and a plurality of nonvolatile memory devices, the method including: powering down a host interface in response to a power-off detection signal; moving data from the first memory to the second memory; powering down the first memory after the data has been moved to the second memory; and programming the data moved to the second memory to a first one of the plurality of nonvolatile memory devices.

BRIEF DESCRIPTION OF THE FIGURES

The above and other features of the inventive concept will become more apparent by describing in detail exemplary embodiments thereof with reference to the accompanying drawings.

FIG. 8 is a table illustrating a change of an interleaving mode according to an exemplary embodiment of the inventive concept.

DETAILED DESCRIPTION OF THE EMBODIMENTS

Figure 1:
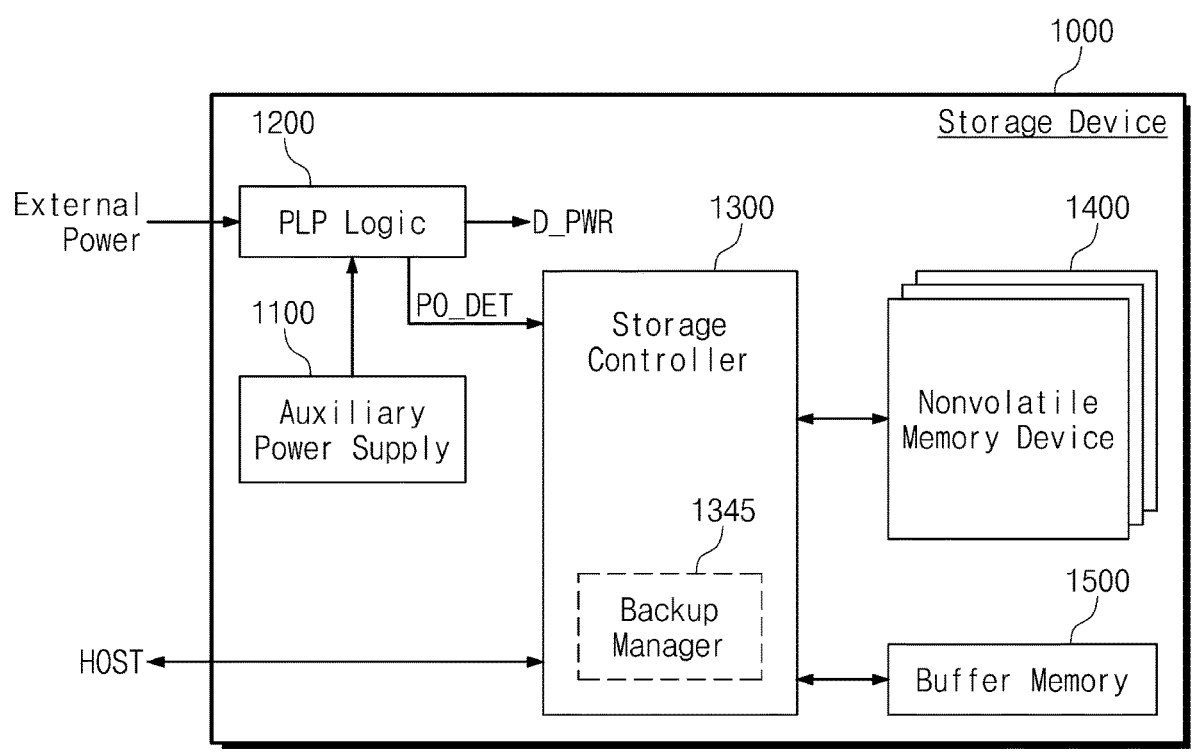
FIG. 1 is a block diagram illustrating a storage device according to an exemplary embodiment of the inventive concept.

Hereinafter, a storage device using a flash memory device will be used to describe exemplary embodiments of the inventive concept. However, one skilled in the art will understand that the inventive concept is not limited thereto and that the inventive concept may be implemented or applied through other embodiments. It is to be further understood that in the drawings, like reference numerals may refer to the same or similar elements.

Hereinafter, a "shut-down" state may refer to a stand-by state (or an idle state) in which a power is supplied but a function is disabled and a turn-off state in which a power is substantially turned off.

FIG. 1 is a block diagram illustrating a storage device according to an exemplary embodiment of the inventive concept. Referring to FIG. 1, a storage device 1000 may include an auxiliary power supply 1100, power loss prevention logic 1200 (e.g., PLP Logic), a storage controller 1300, a nonvolatile memory device 1400, and a buffer memory 1500.

The auxiliary power supply 1100 supplies a stored energy to the storage device 1000 when a power-off event in which an external power is blocked occurs. By using the energy from the auxiliary power supply 1100, the storage device 1000 may complete an operation being performed and may perform a data backup operation. However, as the capacity or performance of the storage device 1000 increases, energy that is consumed in a backup operation increases. However, by efficiently using the limited energy stored in the auxiliary power supply 1100 using the inventive techniques described herein, the reliability of the backup operation will increase.

The power loss prevention logic 1200 is a component for preventing the loss of a power that is supplied to the storage device 1000. The power loss prevention logic 1200 may be an integrated circuit (IC), a chip, or an element. In a situation where the external power is normally supplied, the power loss prevention logic 1200 provides the external power as a device power D_PWR that the storage device 1000 uses. In the case where the external power is blocked, the power loss prevention logic 1200 provides an output of the auxiliary power supply 1100 as the device power D_PWR that the storage device 1000 uses. In other words, the power loss prevention logic 1200 may switch from the external power to the auxiliary power supply 1100.

In addition, the power loss prevention logic 1200 may detect a power-off event (PO Event) such as disconnection of an external power or a serious voltage drop. When the power-off event (PO Event) is detected, the power loss prevention logic 1200 may provide a power-off detection signal PO_DET to the storage controller 1300. The power loss prevention logic 1200 may switch a source of the device power D_PWR for driving the storage device 1000 from the external power to the auxiliary power device 1100. An exemplary configuration of the power loss prevention logic 1200 will be more fully described with reference to FIG. 2.

The storage controller 1300 may be configured to control the nonvolatile memory device 1400 and the buffer memory 1500 in response to a command from a host or under control of the host. For example, in response to a request of a host, the storage controller 1300 may write data to the nonvolatile memory device 1400 or may read data stored in the nonvolatile memory device 1400 and provide the read data to the host. To access the nonvolatile memory device 1400, the storage controller 1300 may provide a command, an address, data, and a control signal to the nonvolatile memory device 1400.

The storage controller 1300 may perform a backup operation which efficiently utilizes power according to an exemplary embodiment of the inventive concept. For example, when the storage controller 1300 is provided with the power-off detection signal PO_DET from the power loss prevention logic 1200, the storage controller 1300 interrupts an operation being currently performed. Next, the storage controller 1300 enters a backup mode and backs up data stored in the buffer memory 1500 to the nonvolatile memory device 1400. In this case, the storage controller 1300 may disable an operation associated with an intellectual property (or a function block) or interface circuits in communication with the host. The storage controller 1300 may move backup data stored in the buffer memory 1500 to a static random access memory (SRAM) in the storage controller 1300 and may then shut down the buffer memory 1500. In other words, after backup data are moved, the storage controller 1300 may provide a stand-by command to the buffer memory 1500 or may block a power of the buffer memory 1500. The storage controller 1300 may program the backup data stored in the SRAM to the nonvolatile memory device 1400 in a minimum power mode. The minimum power mode may be implemented by partially shutting-down the nonvolatile memory device 1400. The backup operation of the storage controller 1300 described above may be performed by a backup manager 1345. The backup manager 1345 may be included in the storage controller 1300 in the form of hardware or may be implemented in the form of software or firmware. A detailed configuration or operation of the storage controller 1300 will be described with reference to drawings to be described later.

Under control of the storage controller 1300, the nonvolatile memory device 1400 may store data received from the storage controller 1300 or may transmit data stored therein to the storage controller 1300. The nonvolatile memory device 1400 is provided as a storage medium of the storage device 1000. For example, the nonvolatile memory device 1400 may be a high-capacity NAND-type flash memory. The nonvolatile memory device 1400 may include a plurality of flash memory devices.

In general, the plurality of flash memory devices are connected with the storage controller 1300 in units of a channel. A plurality of flash memory devices that communicate with the storage controller 1300 through the same data bus are connected with one channel. The nonvolatile memory device 1400 may communicate with the storage controller 1300 in a channel/way interleaving manner. In particular, when a power-off event occurs, the nonvolatile memory device 1400 may operate in an interleaving mode in which the nonvolatile memory device 1400 communicates with the storage controller 1300 with a minimum power.

The buffer memory 1500 may be used as a data buffer for data exchange between the storage device 1000 and the host. In addition, the buffer memory 1500 may store a mapping table in which a logical address (or logical bit address (LBA)) provided to the storage device 1000 is mapped onto an address of the nonvolatile memory device 1400. The buffer memory 1500 temporarily stores write data provided from the host or data read from the nonvolatile memory device 1400. When a read operation is requested from the host, in the case where data present in the nonvolatile memory device 1400 are cached, the buffer memory 1500 supports a cache function of providing the cached data directly to the host. The buffer memory 1500 may be a synchronous dynamic random access memory (SDRAM) for providing sufficient buffering in the storage device 1000 when the storage device 1000 is used as a high-capacity auxiliary storage device. However, the buffer memory 1500 is not limited thereto.

According to the above embodiment of the inventive concept, when the power-off event occurs, the storage device 1000 may block or inactivate a power of blocks that perform interfacing with the host of the storage controller 1300. For example, the storage device 1000 may disable a host interface circuit. The storage controller 1300 may move data of the buffer memory 1500, which can consume a lot of stand-by power in the backup operation, to the SRAM and may then shut down the buffer memory 1500. The storage controller 1300 may program the backup data moved to the SRAM to the nonvolatile memory device 1400 in the minimum power mode. The minimum power mode may include a program technique in which way interleaving is minimized, for example, by programming data to a single level cell (SLC) area or by partially shutting-down the nonvolatile memory device 1400. According to an exemplary embodiment of the inventive concept, the reliability of backup data may be increased even though a power to be consumed in the backup operation of the storage device 1000 is minimized. In addition, it is possible to flexibly cope with an increase in a capacity of backup data of the storage device 1000. It is to be understood that the storage device 1000 may be a high capacity and high performance storage device.

Figure 2:
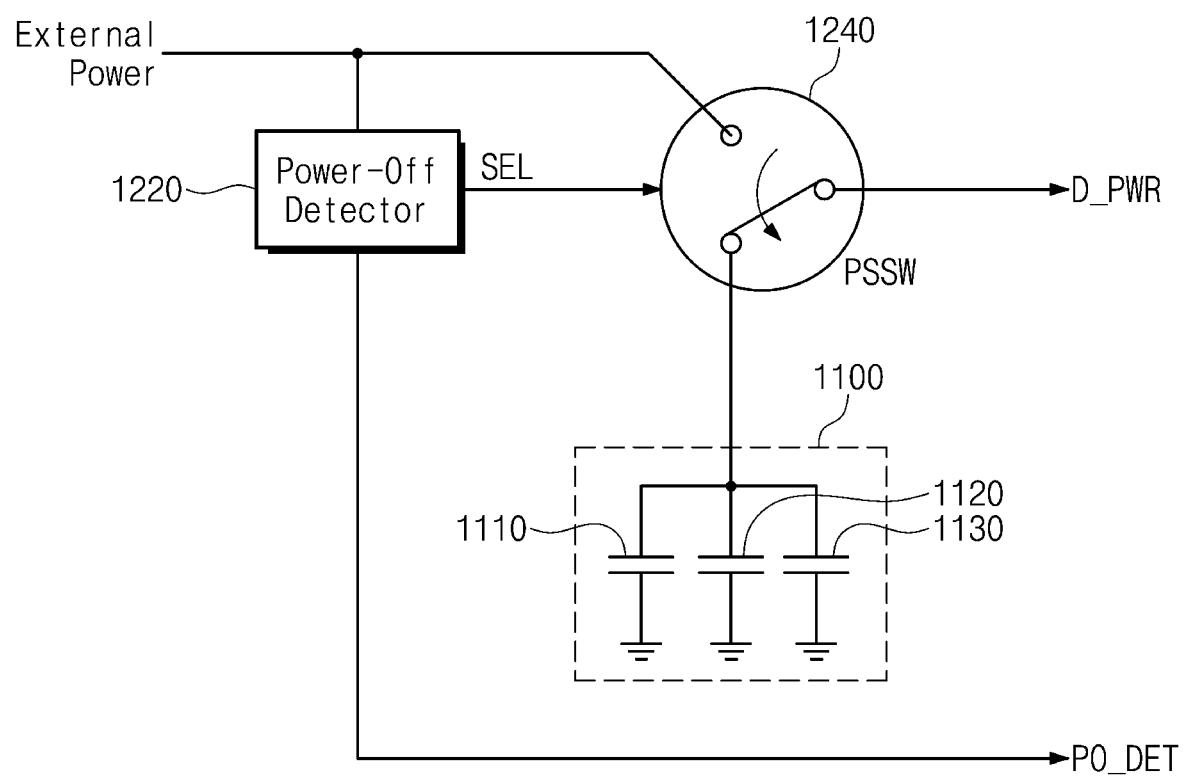
FIG. 2 is a diagram illustrating a configuration and an operation of a power loss prevention device of FIG. 1, according to an exemplary embodiment of the inventive concept.

FIG. 2 is a diagram illustrating a configuration and an operation of a power loss prevention device of FIG. 1, according to an exemplary embodiment of the inventive concept. The power loss prevention logic 1200 of FIG. 1 may hereinafter be referred to as the power loss prevention device 1200. Referring to FIG. 2, the power loss prevention device 1200 may include a power-off detector 1220 and a power selection switch (PSSW) 1240.

The power-off detector 1220 monitors a level of the external power and generates a power selection signal SEL and the power-off detection signal PO_DET based on the monitoring result. The power-off detector 1220 may detect a case where the external power is turned off or a voltage of the external power decreases to a reference value or less. In either case, the power-off detector 1220 may determine that a power-off event has occurred. In this case, the power-off detector 1220 controls the power selection switch 1240 to select the auxiliary power supply 1100, not the external power. In other words, the power selection switch 1240 connects to the auxiliary power supply 1100. The power-off detector 1220 may transmit the power-off detection signal PO_DET to trigger the backup operation of the storage controller 1300. The power-off detection signal PO_DET may be transmitted, for example, through a general-purpose input/output interface (GPIO).

The power selection switch 1240 provides the external power or a power of the auxiliary power device 1100 as the device power D_PWR in response to the power selection signal SEL provided from the power-off detector 1220. In a situation where the external power is normally supplied, the power-off detector 1220 may allow the power selection switch 1240 to provide the external power as the device power D_PWR. However, in the case where the power-off detector 1220 detects the power-off event, the power selection switch 1240 may select the auxiliary power supply 1100 to provide the device power D_PWR.

The auxiliary power supply 1100 may store the energy provided from an external power supply while the external power is supplied. For example, the auxiliary power supply 1100 may include one or more capacitors 1110, 1120, and 1130 charging charges. The auxiliary power supply 1100 may store enough energy to manage the backup operation of the storage device 1000. Accordingly, the plurality of capacitors 1110, 1120, and 1130 may be capacitive elements with high stability. For example, the plurality of capacitors 1110, 1120, and 1130 may be implemented by using elements such as an electrolytic capacitor, a film capacitor, a tantalum capacitor, or a ceramic capacitor (e.g., a multi-layer ceramic condenser (MLCC)). However, the capacitors 1110, 1120, and 1130 of the auxiliary power supply 1100 are not limited to the above examples.

Figure 3:
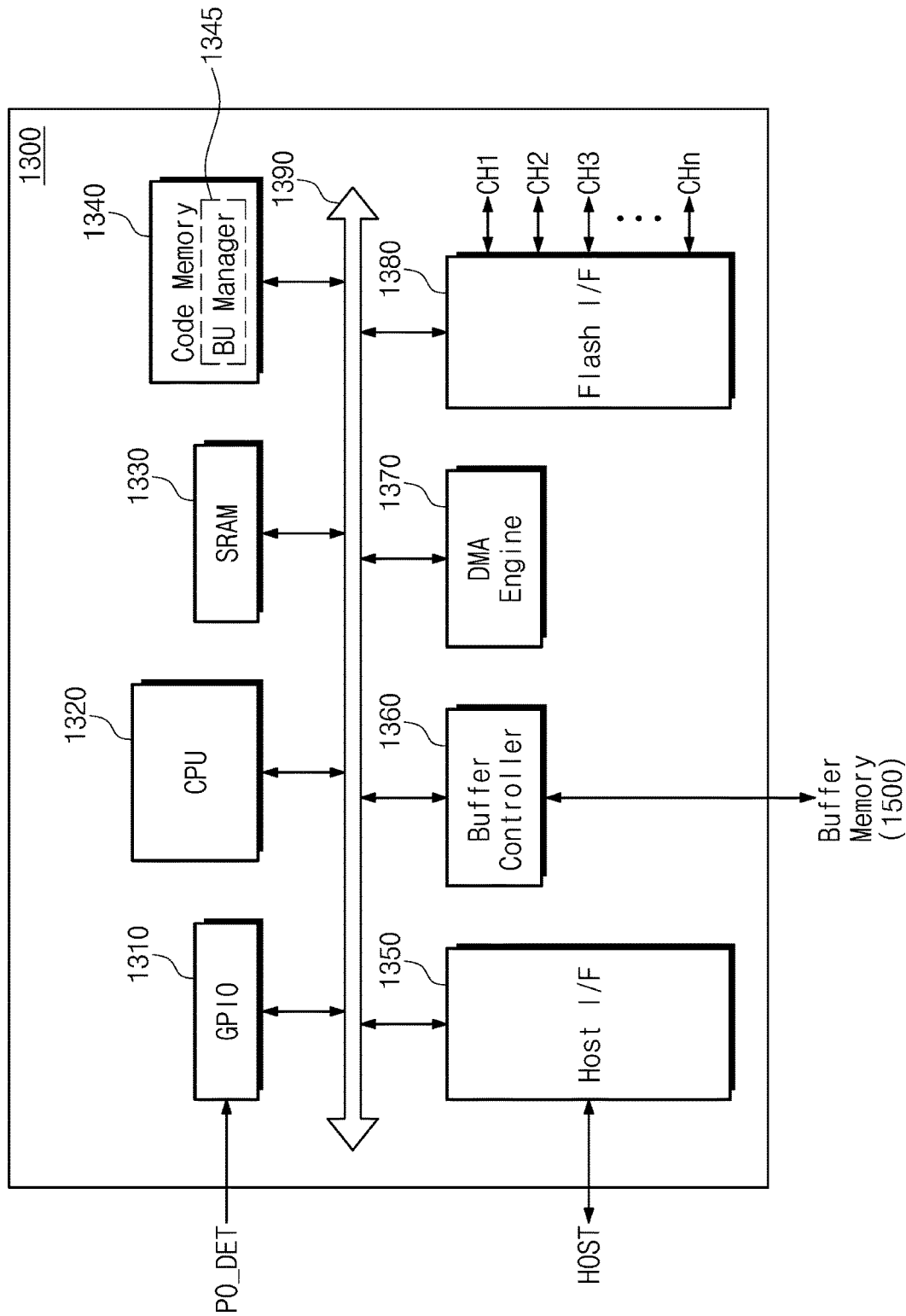
FIG. 3 is a block diagram illustrating a configuration of a storage controller of FIG. 1, according to an exemplary embodiment of the inventive concept.

FIG. 3 is a block diagram illustrating a configuration of a storage controller of FIG. 1, according to an exemplary embodiment of the inventive concept. Referring to FIG. 3, the storage controller 1300 according to an exemplary embodiment of the inventive concept may include a general-purpose input/output interface (GPIO) 1310, a central processing unit (CPU) 1320, an SRAM 1330, a code memory 1340, a host interface 1350, a buffer controller 1360, a direct memory access (DMA) engine 1370, a flash interface 1380, and a system bus 1390.

The general-purpose input/output interface 1310 provides an interface for direction communication with the storage controller 1300. In particular, the general-purpose input/output interface 1310 according to an exemplary embodiment of the inventive concept may receive the power-off detection signal PO_DET provided from the power loss prevention logic 1200. The general-purpose input/output interface 1310 may receive the power-off detection signal PO_DET and may transmit the power-off detection signal PO_DET to the central processing unit 1320.

The central processing unit 1320 may include a processing unit such as a micro-processor. The central processing unit 1320 may manage overall operations of the storage controller 1300. The central processing unit 1320 is configured to drive firmware for driving the storage controller 1300. The central processing unit 1320 may execute, for example, various firmware loaded to the code memory 1340. In particular, the central processing unit 1320 may execute the backup manager 1345 according to an exemplary embodiment of the inventive concept to minimize energy use during backup. As the backup manager 1345 is executed, the central processing unit 1320 may transmit various control information necessary for backup to the relevant components.

For example, as the backup manager 1345 is executed, the central processing unit 1320 detects the power-off event of the storage device 1000. When the power-off event is detected, the central processing unit 1320 may disable or inactivate components, which perform communication with the host, such as the host interface 1350 and the DMA engine 1370. The central processing unit 1320 moves backup data, which remain in the buffer memory 1500, to the SRAM 1330 present in the storage controller 1300. Next, by using a command or a control signal, the central processing unit 1320 shuts down the power of the buffer memory 1500 and the buffer controller 1360 or sets the buffer memory 1500 and the buffer controller 1360 to an inactive mode. Lastly, the central processing unit 1320 programs the backup data moved to the SRAM 1330 to the nonvolatile memory device 1400. In this case, also, under control of the central processing unit 1320, the flash interface 1380 may control the interleaving mode and may program the backup data to the nonvolatile memory device 1400 in the minimum power mode.

The SRAM 1330 may be used as a cache memory or a working memory of the central processing unit 1320. The SRAM 1330 may store codes and instructions that the central processing unit 1320 executes. The SRAM 1330 may store data that are processed by the central processing unit 1320. For example, data for interfacing with the host may be stored in the SRAM 1330. When the power-off event occurs, because a function of exchanging data with the host is disabled, the function of the SRAM 1330 may be restricted. In this case, according to an exemplary embodiment of the inventive concept, backup data that are pending in the buffer memory 1500 may be moved to the SRAM 1330. In other words, when the power-off event occurs, instead of the buffer memory 1500 consuming a lot of power, the SRAM 1330 may buffer backup data.

Codes or firmware for driving or controlling the storage controller 1300 are loaded to the code memory 1340. For example, firmware for performing basic functions of the storage controller 1300 manufactured for a specific purpose may be loaded to the code memory 1340. For example, the backup manager 1345 is stored in the code memory 1340 according to an exemplary embodiment of the inventive concept. When the power-off event is detected, the backup manager 1345 controls a procedure for backing up data of the buffer memory 1500 or the SRAM 1330 to the nonvolatile memory device 1400. When the backup manager 1345 is executed by the central processing unit 1320, the host interface 1350, the DMA engine 1370, the buffer memory 1500, the buffer controller 1360, and the nonvolatile memory device 1400 are sequentially shut down corresponding to the movement of the backup data by partially blocking a power thereto. It is to be understood however, that the host interface 1350, the DMA engine 1370, the buffer memory 1500, the buffer controller 1360, and the nonvolatile memory device 1400 may not be sequentially shut down. For example, the host interface 1350 and the DMA engine 1370 may be shut down at the same time. Here, the code memory 1340 may be referred to as a "memory" capable of loading firmware or a code.

The host interface 1350 provides an interface between the host and the storage controller 1300. When the power-off event occurs, the overall communication between the storage device 1000 and the host is blocked. Accordingly, even though the host interface 1350 is disabled or inactivated when the power-off event occurs, this is not a concern. In this case, for example, a power that is provided to a physical layer (PHY) of the host interface 1350 effectuating communication with the host may be blocked. Alternatively, a clock signal that is provided to the physical layer (PHY) of the host interface 1350 may be blocked when the power-off event occurs. The host and the storage controller 1300 may be connected through one of various standardized interfaces. Here, the standardized interfaces include various interfaces such as an advanced technology attachment (ATA) interface, a serial ATA (SATA) interface, an external SATA (e-SATA) interface, a small computer small interface (SCSI), a serial attached SCSI (SAS), a peripheral component interconnection (PC) interface, a PC Express (PC-E) interface, a universal serial bus (USB) interface, an IEEE 1394 interface, a universal flash store (UFS) interface, and a card interface.

The buffer controller 1360 controls read and write operations of the buffer memory 1500. For example, the buffer controller 1360 temporarily stores write data or read data to the buffer memory 1500 under control of the central processing unit 1320 or the DMA engine 1370. For example, the buffer controller 1360 may classify and manage a memory area of the buffer memory 1500 by a stream under control of the central processing unit 1320. Under control of the central processing unit 1320, the buffer controller 1360 may update a head pointer or a tail pointer of the buffer memory 1500 implemented with a ring buffer or a circular buffer and may output the updated pointer to the outside. For example, when the power-off event occurs, the buffer controller 1360 controls the buffer memory 1500 to move backup data stored in the buffer memory 1500 to the SRAM 1330. When the backup data stored in the buffer memory 1500 are completely read, the backup manager 1345 may shut down the power that is provided to the buffer memory 1500. The shut-down of the buffer memory 1500 may be performed by using a physical power gating switch. Alternatively, to shut down the buffer memory 1500, a command for blocking a power may be transmitted to a power management integrated circuit (PMIC) or a voltage regulator, which provides a power to the buffer memory 1500, by using a control channel such as I2C (e.g., inter-integrated circuit). When the buffer memory 1500 is shut down, under control of the central processing unit 1320, a power that is supplied to the buffer controller 1360 may be completely or partially blocked, or a clock signal that is supplied to the buffer controller 1360 may be blocked.

The DMA engine 1370 controls a direct memory access (DMA) operation of the storage device 1000. The DMA engine 1370 performs data transmission with the host or any other external device under control of the central processing unit 1320. For example, in a DMA transfer mode, the DMA engine 1370 may transmit read data loaded to the buffer memory 1500 to the host in the form of a stream. Alternatively, in the DMA transfer mode, the DMA engine 1370 may store stream data provided from the host to the buffer memory 1500. The DMA engine 1370 performs the DMA operation of the buffer memory 1500 with the host. The DMA operation is interrupted when the power-off event occurs. Accordingly, as the backup data stored in the buffer memory 1500 are moved to the SRAM 1330, the power or clock signal of the DMA engine 1370 may be blocked.

The flash interface 1380 provides interfacing between the storage controller 1300 and the nonvolatile memory device 1400. For example, data processed by the central processing unit 1320 are stored to the nonvolatile memory device 1400 through the flash interface 1380. In particular, when the power-off event occurs, the flash interface 1380 communicates with the nonvolatile memory device 1400 in the minimum power mode. The flash interface 1380 may transmit backup data to the nonvolatile memory device 1400 connected with respective channels CH1, CH2, CH3 . . . CHn in the minimum interleaving mode. The flash interface 1380 may control (or change) an interleaving manner associated with the nonvolatile memory device 1400 under control of the central processing unit 1320. Under control of the central processing unit 1320, the flash interface 1380 may minimize the number of times of way interleaving of each channel is performed within a particular range.

Components of the storage controller 1300 are described above. Due to the function of the storage controller 1300 according to an exemplary embodiment of the inventive concept, when the power-off event occurs, a power of components not associated with the backup operation may be blocked or inactivated in a state where a power is supplied to only components necessary for the backup operation. In other words, power is supplied to a minimum number of components needed for the backup operation. Accordingly, when the power-off event occurs, the limited energy of the auxiliary power supply 1100 may be efficiently used. For example, the energy of the auxiliary power supply 1100 is efficiently controlled such that the backup operation may be completed in its entirety and no data is lost.

Figure 4:
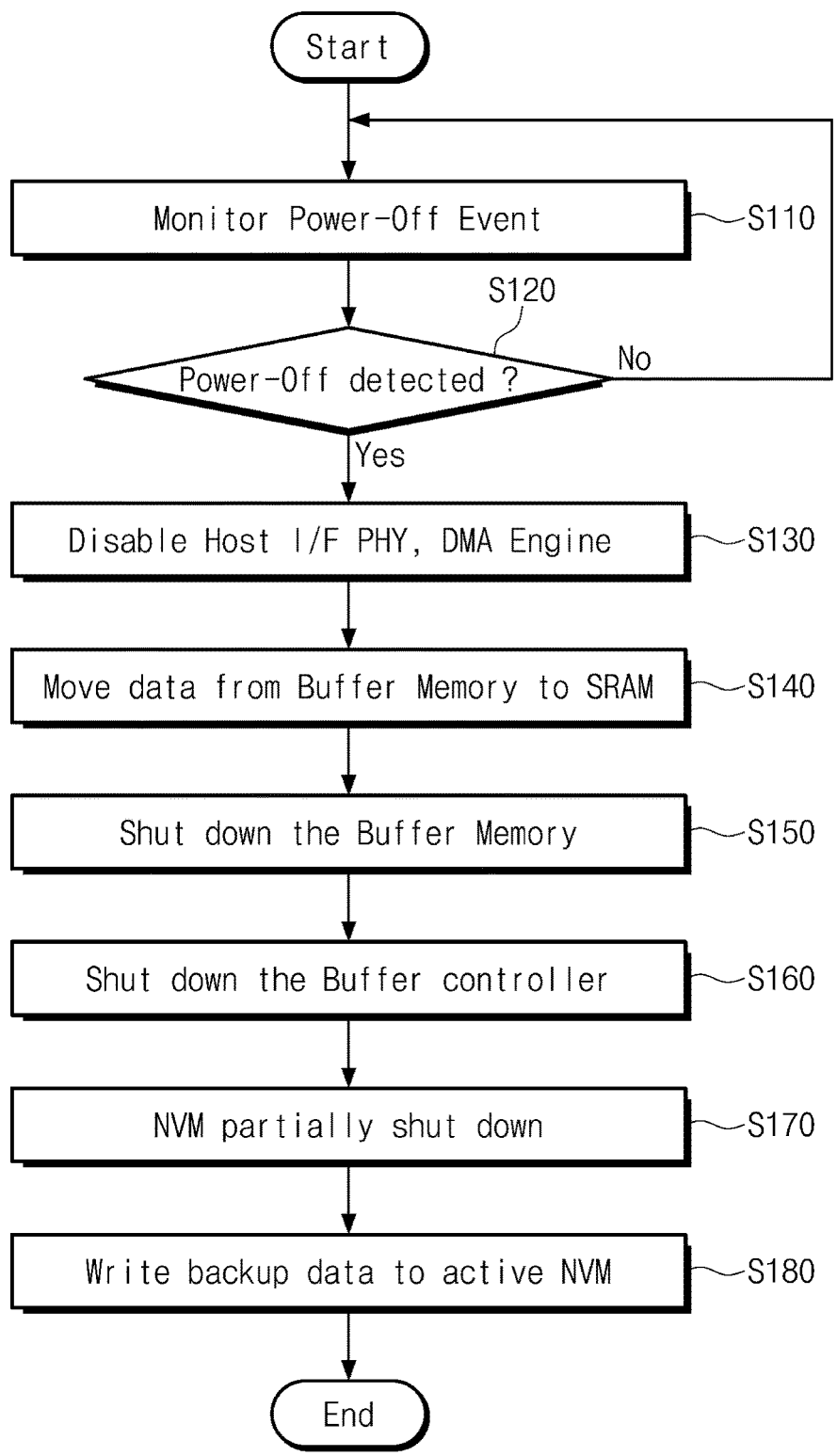
FIG. 4 is a flowchart illustrating a backup method according to an exemplary embodiment of the inventive concept, which a storage controller of FIG. 3 performs.

FIG. 4 is a flowchart illustrating a backup method according to an exemplary embodiment of the inventive concept, which a storage controller of FIG. 3 performs. Referring to FIG. 4, when the power-off event occurs, the storage controller 1300 performs a sequential backup operation for minimum power consumption.

In operation S110, the storage controller 1300 may monitor whether the power-off event occurs. The storage controller 1300 monitors the power-off detection signal PO_DET provided from the power loss prevention logic 1200 (refer to FIG. 1). When the external power is turned off or a level of the external power decreases to a reference value or less, the power loss prevention logic 1200 may provide the power-off detection signal PO_DET to the storage controller 1300. The power loss prevention logic 1200 uses a power of the auxiliary power supply 1100 as the device power D_PWR. In other words, the power loss prevention logic 1200 switches to the auxiliary power supply 1100 when the external power is turned off or when a level of the external power decreases to a reference value or less.

In operation S120, the storage controller 1300 monitors the power-off detection signal PO_DET from the power loss prevention logic 1200 and detects the occurrence of the power-off event. When the power-off detection signal PO_DET is activated, the procedure proceeds to operation S130 to perform the backup operation according to an exemplary of the inventive concept. When the power-off detection signal PO_DET is in an inactive state, the procedure proceeds to operation S110 to continue to monitor the power-off event. It is to be understood that the power-off detection signal PO_DET may be in the inactive state under normal operation of the external power source.

In operation S130, the storage controller 1300 may block or inactivate a power of components of the storage controller 1300, which are associated with communication with the host. For example, the storage controller 1300 may block a clock signal that is provided to the host interface 1350 which interfaces with the host. For example, the storage controller 1300 may inactivate a phase locked loop (PLL) that is used to exchange data with the host and is included in the host interface 1350. In addition, a power of the DMA engine 1370 which performs a direct memory access (DMA) with the host may also be blocked. The power may be cut-off in response to a command provided in units of an intellectual property (IP) or by a power gating control performed in units of an IP.

In operation S140, data that are present on the buffer memory 1500 are moved to the SRAM 1330. The buffer memory 1500 may be an SDRAM that requires a continuous refresh operation, thereby consuming a large amount of power. Accordingly, to minimize power consumption, backup data that remain in the buffer memory 1500 may be moved to the SRAM 1330 which is a low-power memory.

In operation S150, the buffer memory 1500, from which the backup data has been completely removed, is shut down. A power gating switch that is present on a power line providing a power to the buffer memory 1500 may be controlled to shut down the buffer memory 1500. Alternatively, a command of an I2C interface for controlling a PMIC or a voltage regulator providing a power to the buffer memory 1500 may be used to shut down the buffer memory 1500.

In operation S160, the buffer controller 1360 is shut down. The buffer controller 1360 which interfaces with the buffer memory 1500 is not required after the buffer memory 1500 is shut down. Thus, to prevent power consumption of the buffer controller 1360 in even an idle state, a power of the buffer controller 1360 may be blocked, or the buffer controller 1360 may be inactivated.

In operation S170, the central processing unit 1320 sets the communication between the flash interface 1380 and the nonvolatile memory device 1400 to the minimum power mode. For example, the central processing unit 1320 may change the interleaving mode of the flash interface 1380 to a mode corresponding to a minimum bandwidth. For example, in the case where the storage device 1000 is driven by the external power, the flash interface 1380 may communicate with the nonvolatile memory device 1400 in the interleaving mode for providing maximum performance. In this case, the flash interface 1380 may use an interleaving mode (e.g., a 32-way mode) in which all nonvolatile memory devices connected with respective channels are used. However, when the power-off event occurs, the flash interface 1380 may communicate with the nonvolatile memory device 1400 in the interleaving mode for using a minimum power rather than maximum performance. In this case, the flash interface 1380 may use an interleaving mode (e.g., an 8-way mode) in which a minimum bandwidth is provided. In this case, nonvolatile memory devices corresponding to a channel or way not used may be set to an inactive mode, or a power provided to those nonvolatile memory devices may be blocked.

In operation S180, the backup data stored in the SRAM 1330 are programmed to a nonvolatile memory device to which an auxiliary power is supplied. Because a size of backup data is not great and a power is supplied to a part of the nonvolatile memory device 1400, the backup operation may be sufficiently performed only by using a power provided from the auxiliary power supply 1100.

The backup method of the storage device 1000 according to an exemplary embodiment of the inventive concept is briefly described above. When the power-off event occurs, the limited energy of the auxiliary power supply 1100 may be efficiently used by blocking a power of components not used for the backup and then blocking the power of the components on a backup path after they have been used.

Figure 5:
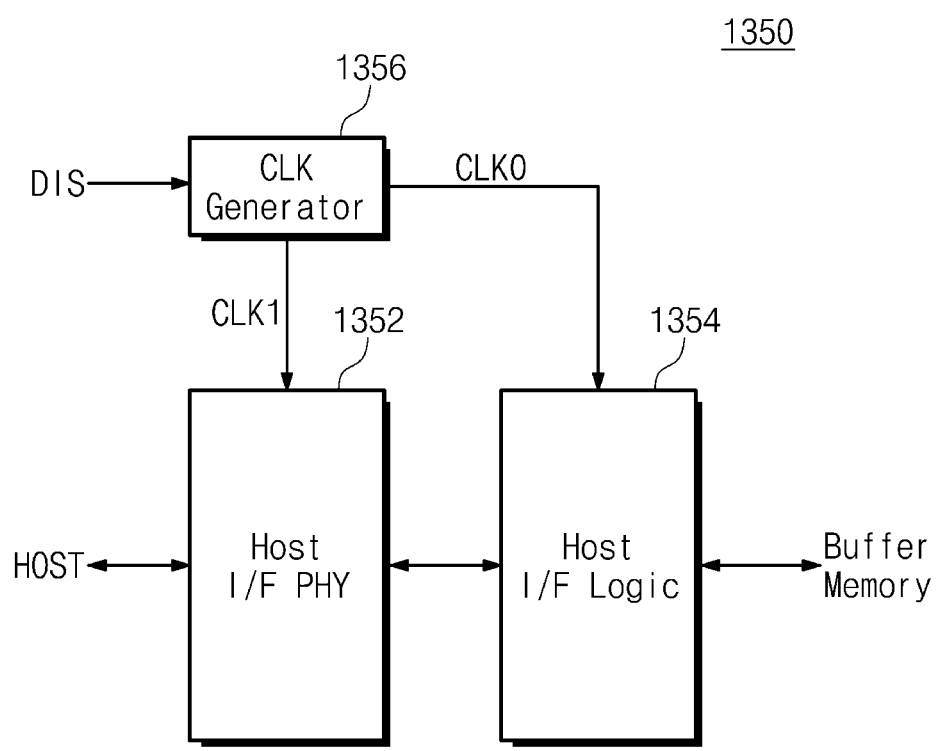
FIG. 5 is a block diagram illustrating a host interface of FIG. 3, according to an exemplary embodiment of the inventive concept.

FIG. 5 is a block diagram illustrating a host interface of FIG. 3, according to an exemplary embodiment of the inventive concept. Referring to FIG. 5, the host interface 1350 may include a host interface physical layer 1352, host interface logic 1354, and a clock generator 1356.

The host interface physical layer 1352 supports a high-speed interface standard of the host. The host interface physical layer 1352 may allow the storage device 1000 to perform communication in compliance with the interface standard (e.g., SATA, SAS, PCIe, or USB) of the host. In compliance with a transport protocol for communication with the host, the host interface physical layer 1352 may transmit an output signal and may receive a reception signal transmitted from the host. For example, the host interface physical layer 1352 may include MIPI M-PHY which supports a high speed data communications physical layer protocol standard.

The host interface logic 1354 performs a control operation and buffering for supporting the transport protocol of the host interface physical layer 1352. For example, in the case where data are transmitted from the buffer memory 1500 to the host, the host interface logic 1354 may process a command corresponding to the transport protocol for transmitting data or may perform a control operation such as interrupt.

The clock generator 1356 generates clock signals CLK0 and CLK1 for driving the host interface 1350. For example, the clock generator 1356 may be a phase locked loop (PLL) circuit. The clock generator 1356 may stop generating at least one of the clock signals CLK0 and CLK1 in response to a disable signal DIS. The disable signal DIS may be provided from the central processing unit 1320. When the clock signal CLK1 is inactivated, an operation of the host interface physical layer 1352 is stopped. When the clock signal CLK0 is inactivated, an operation of the host interface logic 1354 is stopped.

When the power-off event occurs, there is no need for an operation of exchanging data with the host. In this case, the host interface physical layer 1352 and the host interface logic 1354 that perform communication with the host in the storage controller 1300 are not used. As the backup manager 1345 is driven, the central processing unit 1320 may block a power of the host interface 1350 or may inactivate or disable the clock generator 1356. Accordingly, when the power-off event occurs, consumption of an idle power in the host interface 1350 may be prevented.

Figure 6:
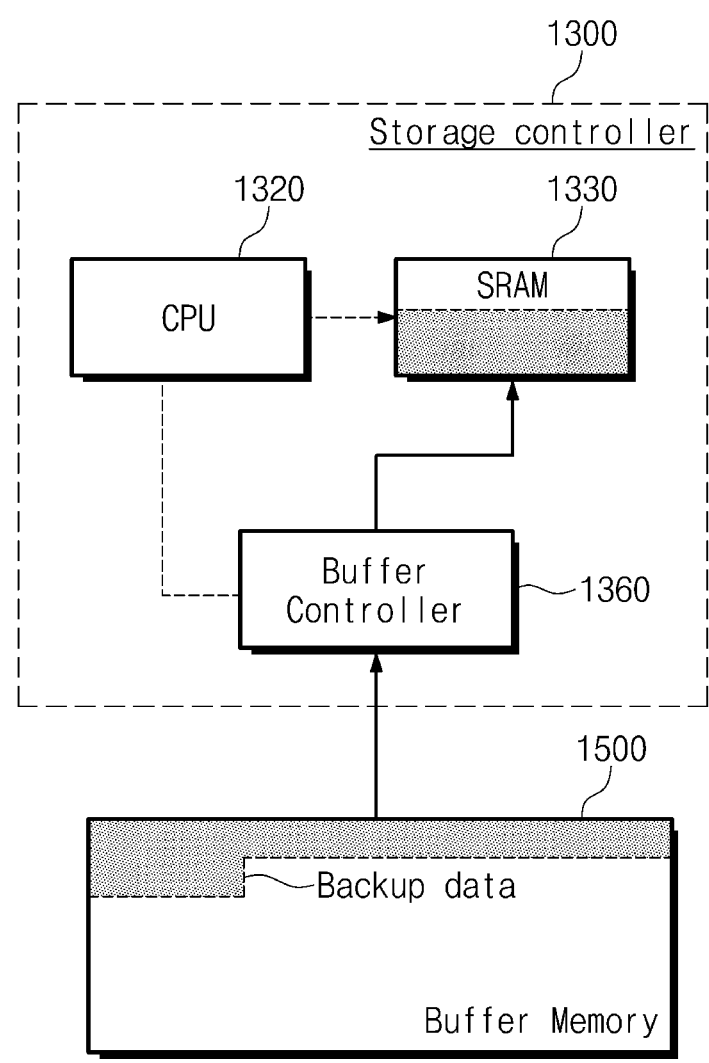
FIG. 6 is a diagram illustrating how backup data are moved from a buffer memory to a static random access memory (SRAM), according to an exemplary embodiment of the inventive concept.

FIG. 6 is a diagram illustrating how backup data are moved from a buffer memory to an SRAM, according to an exemplary embodiment of the inventive concept. Referring to FIG. 6, the central processing unit 1320 may control the buffer controller 1360 such that backup data remaining in the buffer memory 1500 are moved to the SRAM 1330.

After a power or a clock signal to the host interface physical layer 1352 and the DMA engine 1370 is blocked, the moving of the backup data of the buffer memory 1500 to the SRAM 1330 is initiated. Because the buffer memory 1500 is being accessed, a power may be supplied to the buffer controller 1360. First, the central processing unit 1320 may control the buffer controller 1360 to read the backup data remaining in the buffer memory 1500. The buffer controller 1360 reads the backup data present in the buffer memory 1500 under control of the central processing unit 1320. The buffer controller 1360 may transmit the read backup data to the SRAM 1330 under control of the central processing unit 1320.

The SRAM 1330 may store the backup data under control of the central processing unit 1320. In the case where a memory for storing the backup data to the SRAM 1330 is insufficient, cache memories or working memories in the storage controller 1300 may be utilized. Alternatively, a portion of the backup data may be selectively stored to the SRAM 1330 depending on importance. For example, metadata such as mapping data may be preferentially stored to the SRAM 1330. In this case, other data may be stored in the cache or working memories.

Figure 7:
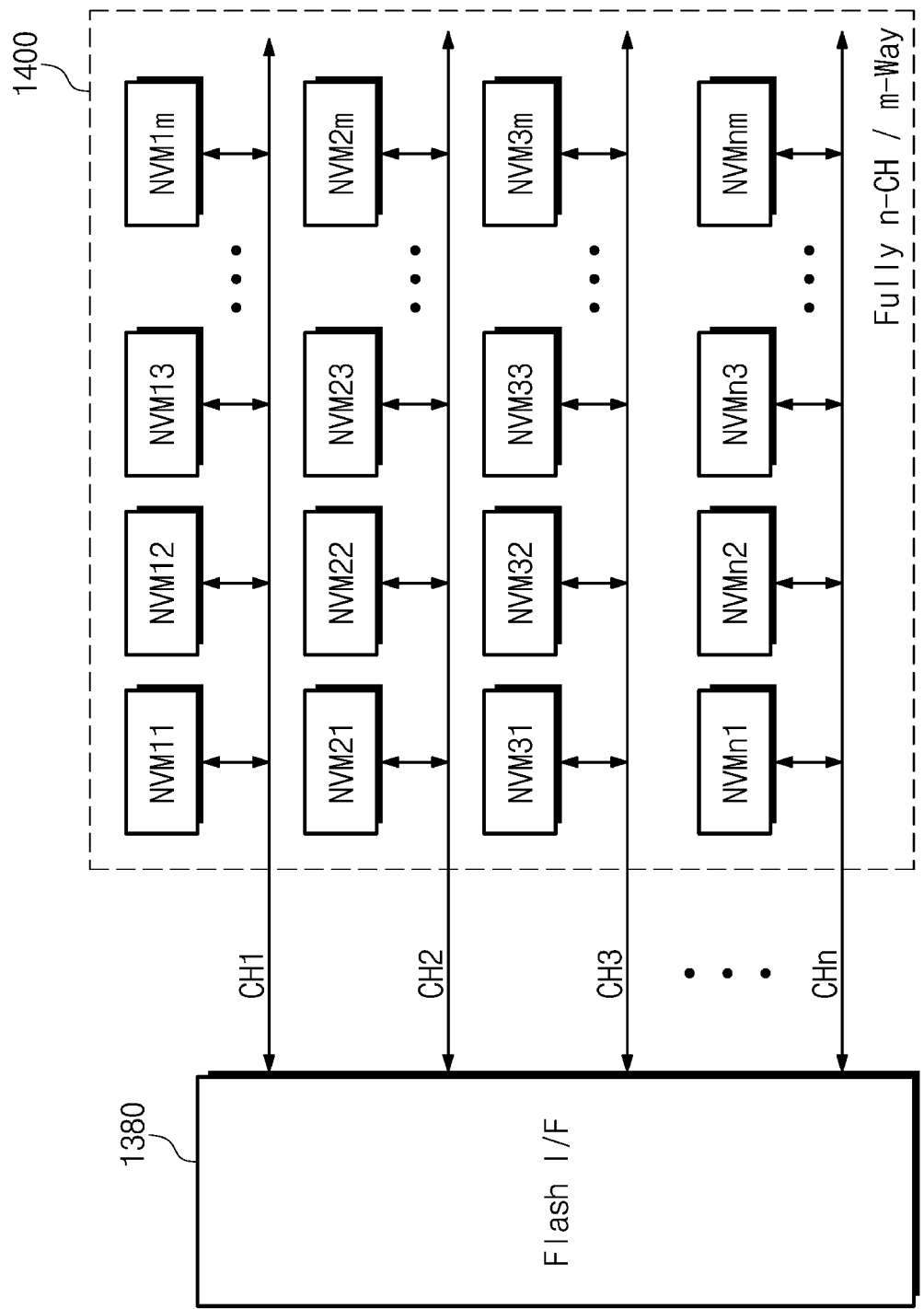
FIG. 7 is a block diagram illustrating a nonvolatile memory device and a flash interface according to an exemplary embodiment of the inventive concept.

FIG. 7 is a block diagram illustrating a nonvolatile memory device and a flash interface according to an exemplary embodiment of the inventive concept. Referring to FIG. 7, the flash interface 1380 may be connected with the nonvolatile memory device 1400 through the plurality of channels CH1, CH2, CH3 . . . CHn.

An input/output port of each of "m" nonvolatile memory devices NVM_11, NVM_12, NVW_13 . . . NVM_1m (m being a natural number) is connected with the first channel CH1. A plurality of nonvolatile memory devices NVM_21 . . . NVMnm are connected with each of the second channel CH2 to the n-th channel CHn in the same manner. Nonvolatile memory devices connected with the same channel share input/output ports.

When the power-off event occurs, the central processing unit 1320 may set a communication mode between the flash interface 1380 and the nonvolatile memory device 1400 to the minimum power mode. For example, the flash interface 1380 may again set a channel/way interleaving manner to a manner (or an interleaving mode) corresponding to the minimum power mode. For example, in a normal mode where the external power is used, the flash interface 1380 may communicate with the nonvolatile memory device 1400 in a fully interleaving manner in which "n" channels and "m" ways all are used. However, when the power-off event occurs, the flash interface 1380 may communicate with the nonvolatile memory device 1400 in a partial interleaving manner in which a part of the "n" channels and a part of the "n" ways are used.

A memory size of the nonvolatile memory device 1400 that is necessary to program backup data is not great. Accordingly, there is no need to use the fully interleaving manner, which requires large power consumption, in the backup operation in which the device power D_PWR is provided from the auxiliary power supply 1100. Accordingly, even though the interleaving mode is switched to the partial interleaving manner capable of using a minimum power, it is possible to program backup data.

FIG. 8 is a table illustrating a change of an interleaving mode according to an exemplary embodiment of the inventive concept. Referring to FIG. 8, the flash interface 1380 may operate in a backup mode that is set when the power-off event occurs or a normal mode in which the external power is provided. This is illustrated in the column under "PW mode".

The normal mode corresponds to a full power mode in which all ways are applied to interleaving. For example, in the case where 32 nonvolatile memory devices are connected with one channel, there may be used a 32-way interleaving manner in which all the nonvolatile memory devices connected with the channel are interleaved.

In the backup mode, some of the nonvolatile memory devices connected with the channel may be used for interleaving, and a power of the remaining nonvolatile memory devices may be blocked, or the remaining nonvolatile memory devices may be changed to an inactive mode. For example, in the table of FIG. 8, in the backup mode, an 8-way interleaving manner may be employed. Accordingly, the flash interface 1380 and the nonvolatile memory device 1400 may operate in the minimum power mode.

Features of exemplary embodiments of the inventive concept are described above by using the interleaving mode consuming a minimum power in the way interleaving manner. However, the interleaving manner is only an example, and it is understood that various channel/way interleaving manners can be used to minimize power consumption.

Figure 9A:
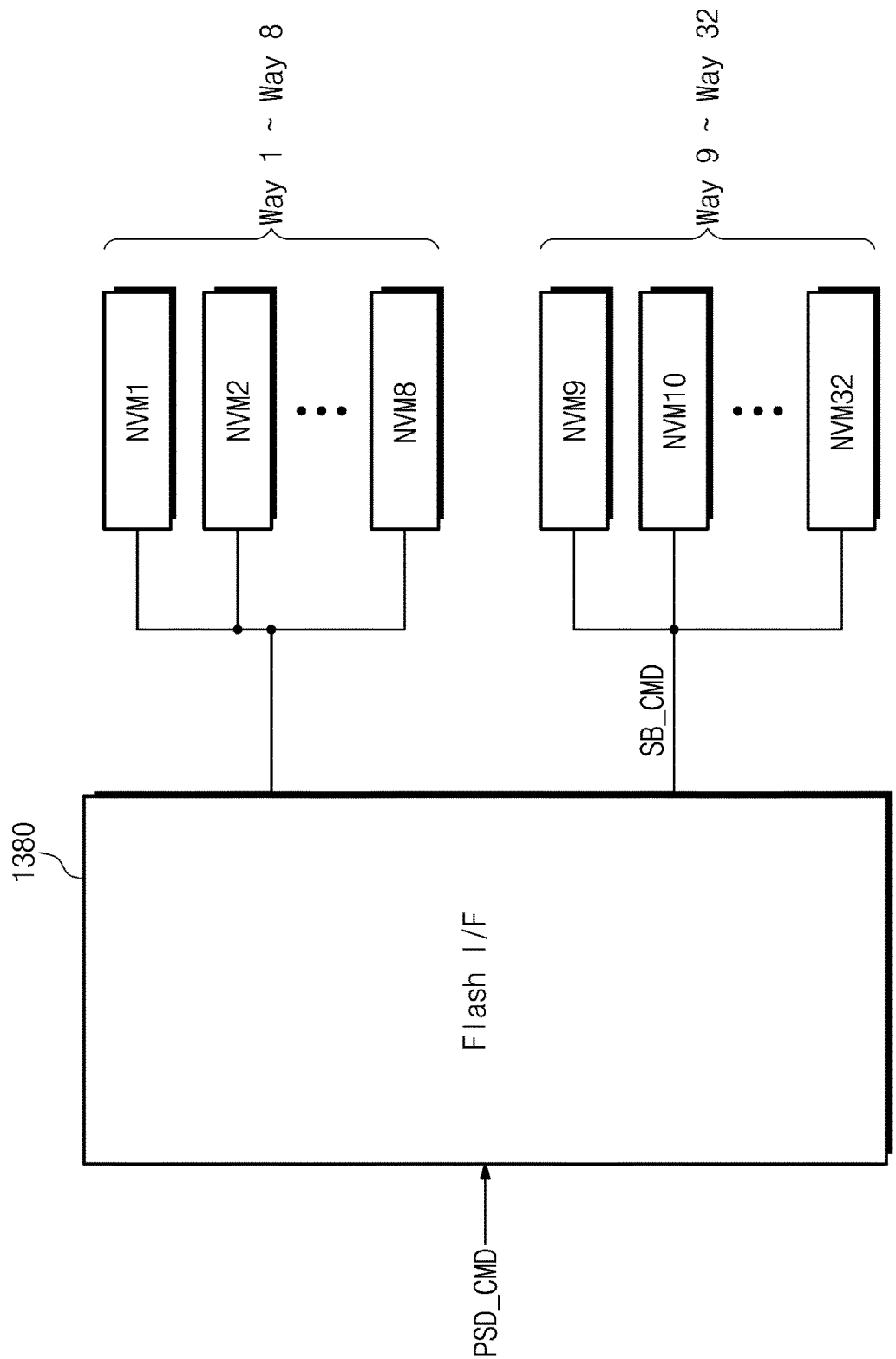
FIGS. 9A, 9B, and 9C are diagrams illustrating a method for power connection between a flash interface and a nonvolatile memory device in a backup operation according to an exemplary embodiment of the inventive concept.
Figure 9B:
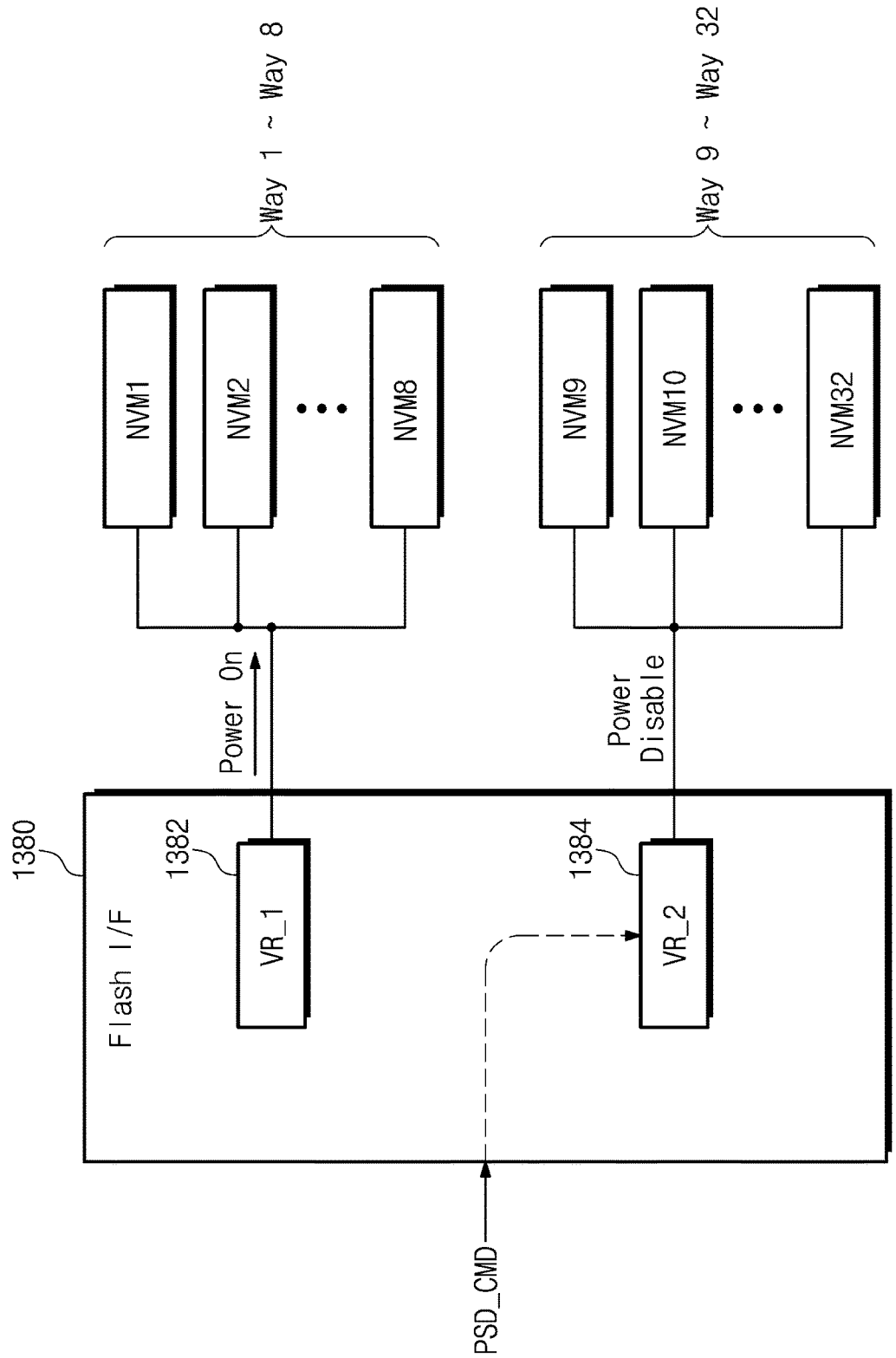
Figure 9C:
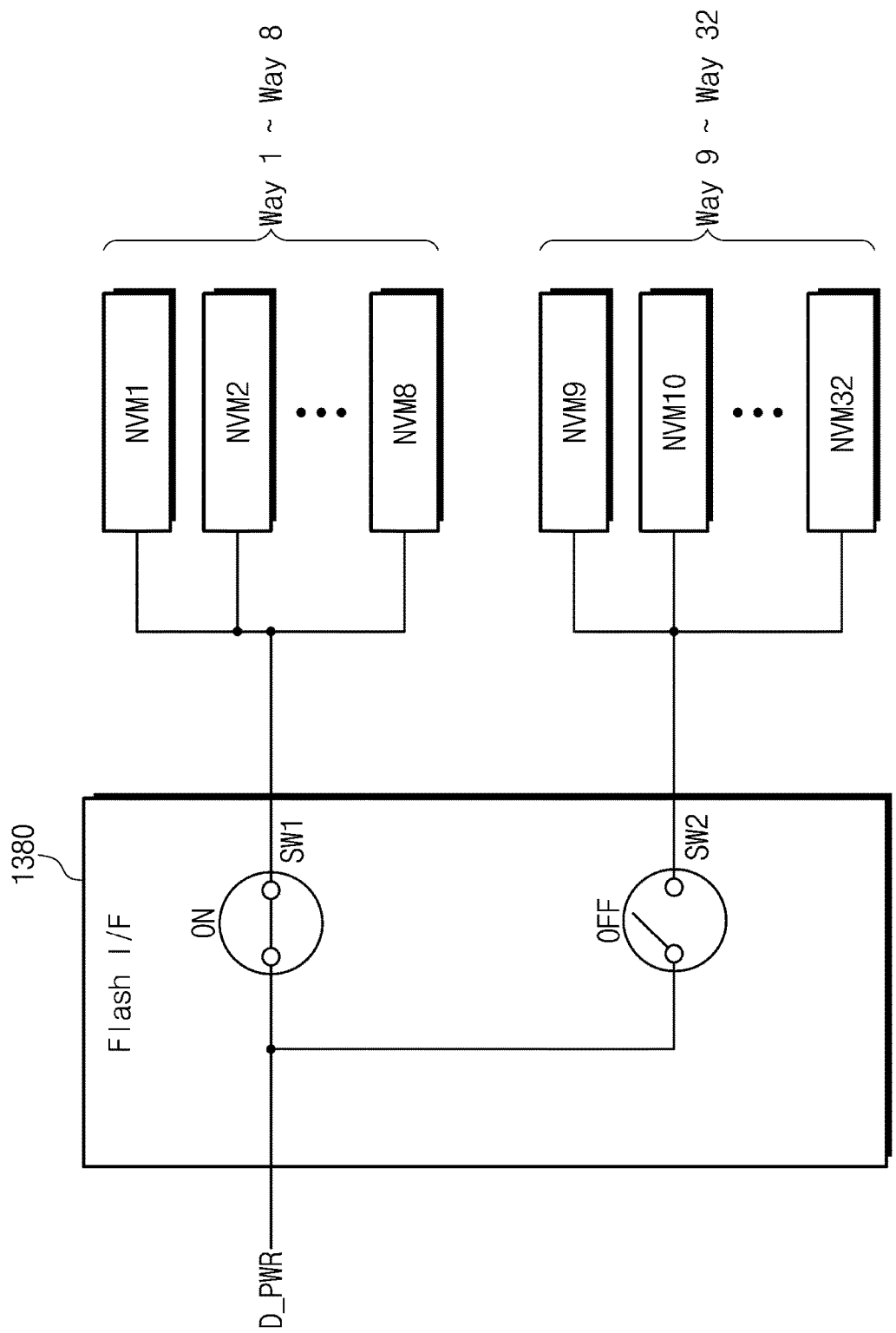

FIGS. 9A, 9B, and 9C are diagrams illustrating a method for power connection between a flash interface and a nonvolatile memory device in a backup operation according to an exemplary embodiment of the inventive concept.

Referring to FIG. 9A, when the power-off event occurs, the flash interface 1380 may receive a partial shut-down command PSD_CMD from the central processing unit 1320 (refer to FIG. 3). In this case, the flash interface 1380 may transmit a stand-by command SB_CMD to nonvolatile memory interface NVM9 to NVM32 while maintaining a state of nonvolatile memory devices (e.g., NVM1 to NVM8).

In contrast, in the normal mode where the external power is normally provided to the storage device 1000, a separate state control command may not be transmitted to the nonvolatile memory devices NVM1 to NVM32. In other words, the stand-by command SB_CMB may not be transmitted to the nonvolatile memory devices NVM1 to NVM32. Accordingly, all the nonvolatile memory devices NVM1 to NVM32 may normally perform interleaving.

However, in the case where the power-off event occurs, the flash interface 1380 may transmit the stand-by command SB_CMD to some nonvolatile memory devices (e.g., NVM9 to NVM32) in response to the partial shut-down command PSD_CMD provided from the central processing unit 1320. Accordingly, only the nonvolatile memory devices NVM1 to NVM8 to be used for backup may maintain an activated state, and the nonvolatile memory devices NVM9 to NVM32 not used for backup may enter a stand-by mode.

Here, the nonvolatile memory devices NVM1 to NVM8 may be devices constituting ways Way 1 to Way8 in a way interleaving mode. The nonvolatile memory devices NVM9 to NVM32 may be devices constituting the remaining ways Way 9 to Way32 in the way interleaving mode.

Referring to FIG. 9B, when the power-off event occurs, the flash interface 1380 may receive the partial shut-down command PSD_CMD from the central processing unit 1320 (refer to FIG. 3). In this case, the flash interface 1380 may control a component (e.g., a voltage regulator) for supplying a power to the nonvolatile memory device 1400 to provide a power to only some nonvolatile memory devices (e.g., NVM1 to NVM8) to be used for backup.

In the normal mode where the external power is normally provided to the storage device 1000, the flash interface 1380 may activate all of first and second voltage regulators 1382 and 1384. Accordingly, a power may be normally supplied to all the nonvolatile memory devices NVM1 to NVM32.

However, in the case where the power-off event occurs, the flash interface 1380 may supply a power only to some nonvolatile memory devices (e.g., NVM1 to NVM8) in response to the partial shut-down command PSD_CMD provided from the central processing unit 1320. In other words, in response to the partial shut-down command PSD_CMD, the flash interface 1380 may activate only the first voltage regulator 1382 and may inactivate the second voltage regulator 1384. Accordingly, a power may be provided only to some nonvolatile memory devices NVM1 to NVM8 to be used for backup.

Here, the nonvolatile memory devices NVM1 to NVM8 may be devices constituting ways Way 1 to Way8 in a way interleaving mode. The nonvolatile memory devices NVM9 to NVM32 may be devices constituting the remaining ways Way 9 to Way32 in the way interleaving mode. In other words, when the power-off event occurs, a channel or way interleaving manner for backup may be changed to a mode using a minimum power.

Referring to FIG. 9C, when the power-off event occurs, the flash interface 1380 may partially provide a power to the nonvolatile memory device 1400. To accomplish this, the flash interface 1380 may include power gating switches SW1 and SW2 for selectively supplying a power to some nonvolatile memory devices.

In the normal mode where the external power is normally provided to the storage device 1000, the flash interface 1380 may maintain all the power gating switches SW1 and SW2 in a turn-on state. In this case, the external power may be provided as the device power D_PWR.

In contrast, when the power-off event occurs, under control of the central processing unit 1320, the flash interface 1380 may provide the device power D_PWR only to some nonvolatile memory devices (e.g., NVM1 to NVM8) to be used for backup. To accomplish this, under control of the central processing unit 1320, the flash interface 1380 may turn on the power gating switch SW1 that supplies a power to the nonvolatile memory devices NVM1 to NVM8. The flash interface 1380 may turn off the power gating switch SW2 that supplies a power to the remaining nonvolatile memory devices (e.g., NVM9 to NVM32) not used for backup.

Here, the nonvolatile memory devices NVM1 to NVM8 may be devices constituting ways Way 1 to Way8 in a way interleaving mode. The nonvolatile memory devices NVM9 to NVM32 may be devices constituting the remaining ways Way 9 to Way32 in the way interleaving mode. In other words, when the power-off event occurs, a channel or way interleaving manner for backup may be changed to a mode using a minimum power.

The description is given above as an interleaving mode in which a minimum power is used to perform the backup operation decreases the number of ways to be interleaved. However, in exemplary embodiments of the inventive concept, it is understood that a channel or way interleaving mode is variously changed to a mode (or condition) for minimum power consumption.

Figure 10:
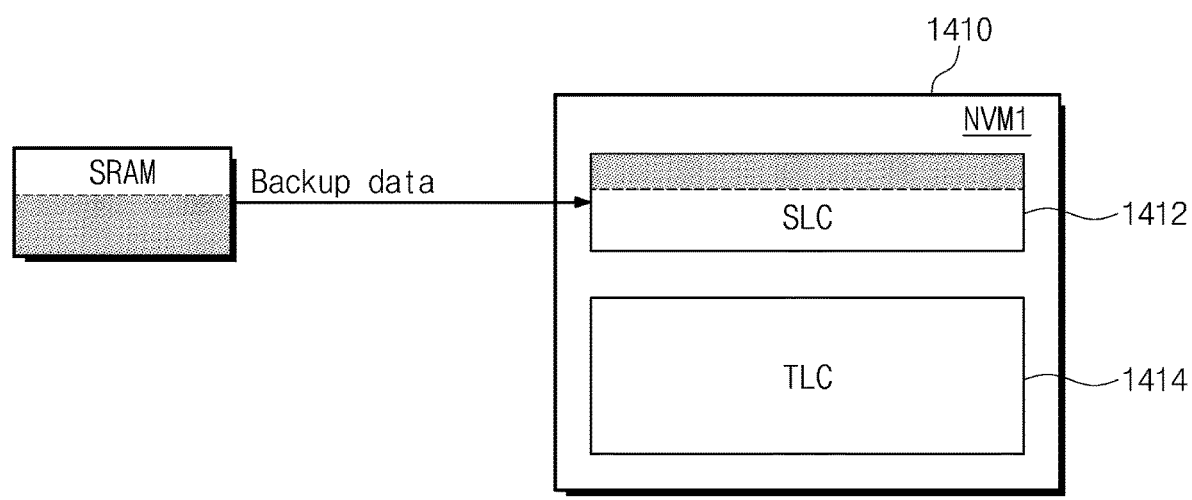
FIG. 10 is a block diagram illustrating a memory area of a nonvolatile memory device in which backup data according to an exemplary embodiment of the inventive concept are stored.

FIG. 10 is a block diagram illustrating a memory area of a nonvolatile memory device in which backup data according to an exemplary embodiment of the inventive concept are stored. Referring to FIG. 10, backup data stored in the SRAM 1330 may be provided to a single level cell (SLC) area of a selected nonvolatile memory device 1410.

The nonvolatile memory device 1410 may include a plurality of areas in which the number of bits to be stored per cell is not equal. For example, the nonvolatile memory device 1400 may include an SLC area 1412 in which 1-bit data are stored per cell and a triple level cell (TLC) area 1414 in which 3-bit data are stored per cell. In general, an operation of programming data to the TLC area 1414 requires a relatively large power. In contrast, an operation of programming data to the SLC area 1412 requires a relatively small power. Accordingly, in the backup mode in which an operation is performed with the limited energy, the backup data stored in the SRAM 1330 is programmed to the SLC area 1412 of the nonvolatile memory device 1400. In the alternative, the backup data stored in the SRAM 1330 may be programmed to the TLC area 1414.

Figure 11:
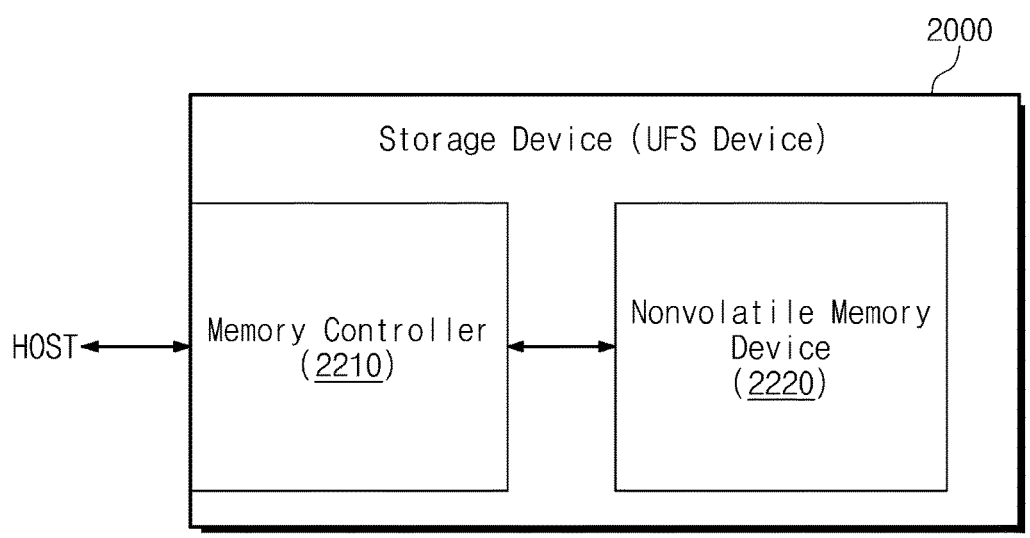
FIG. 11 is a block diagram illustrating another example of storage devices capable of using a backup method according to an exemplary embodiment of the inventive concept.

FIG. 11 is a block diagram illustrating another example of storage devices capable of using a backup method according to an exemplary embodiment of the inventive concept. Referring to FIG. 11, a storage device 2000 may operate under control of the host. For example, the storage device 2000 may include a memory controller 2210 and a nonvolatile memory device 2220. The memory controller 2210 may operate in response to a command received from the host.

For example, the memory controller 2210 may receive a write command and write data from the host and may store the received write data to the nonvolatile memory device 2220 in response to the received write command.

Alternatively, the memory controller 2210 may receive a read command from the host and may read data stored in the nonvolatile memory device 2220 in response to the received read command. Afterwards, the memory controller 2210 may transmit the read data to the host. In an exemplary embodiment of the inventive concept, the nonvolatile memory device 2220 may be a NAND flash memory device, but the inventive concept is not limited thereto.

In an exemplary embodiment of the inventive concept, the host may communicate with the storage device 2000 based on a universal flash storage (UFS) interface defined by the JEDEC standard. For example, the host and the storage device 2000 may exchange packets in the form of a UFS protocol information unit (UPIU). The UPIU may include various information defined by an interface (e.g., a UFS interface) between the host and the storage device 2000. However, the inventive concept is not limited thereto.

In an exemplary embodiment of the inventive concept, when the power-off event occurs, the storage device 1000 may first block a power of a host interface and a DMA engine. Next, backup data present in an SRAM or a DRAM may be programmed to the nonvolatile memory device 2220. In this case, the nonvolatile memory device 2220 may change a mode to an interleaving mode for minimum power consumption.

Figure 12:
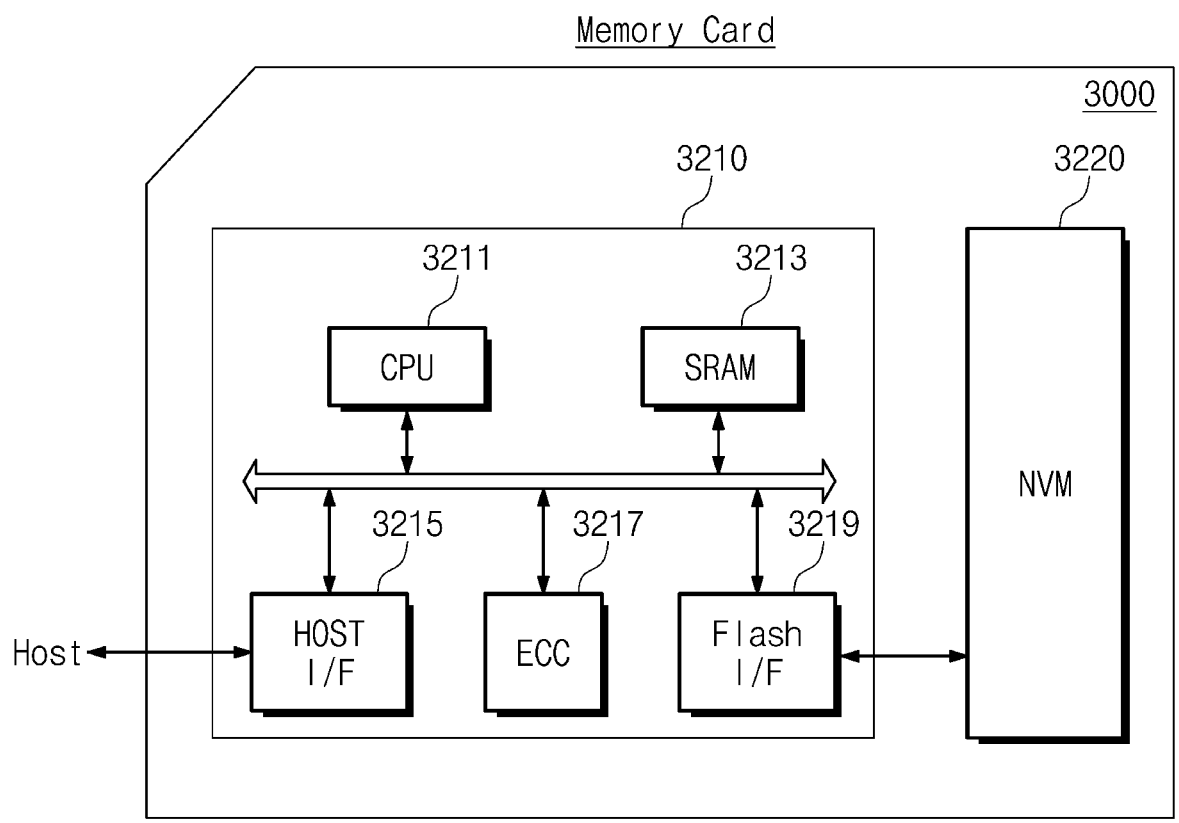
FIG. 12 is a block diagram illustrating a memory card according to another exemplary embodiment of the inventive concept.

FIG. 12 is a block diagram illustrating a memory card according to another exemplary embodiment of the inventive concept. Referring to FIG. 12, a memory card 3000 includes a memory controller 3210 and a nonvolatile memory device 3220. The memory card 3000 includes any storage device, which includes a nonvolatile memory, such as a secure digital (SD) card, a multimedia card (MMC), or a removable mobile storage device (e.g., a USB memory).

The memory controller 3210 may include a central processing unit 3211, an SRAM 3213, a host interface 3215, an error correction block 3217, and a flash interface 3219. The memory controller 3210 may further include an auxiliary power supply. The auxiliary power supply may be located inside the memory controller 3210 or may be located outside the memory controller 3210. The auxiliary power supply has the same configuration and operation as those described in the above embodiments.

The memory card 3000 is connected with the host and is used. The memory card 3000 may exchange data with the host device through the host interface 3215 and may exchange data with the nonvolatile memory 3220 through the flash interface 3219. The memory card 3000 is supplied with a power from the host and performs an internal operation. In the case where the power from the host is suddenly blocked (or is suddenly turned of), the auxiliary power supply provides an auxiliary power for performing an operation of backing up data from the SRAM 3213 to the nonvolatile memory 3220. In particular, the memory controller 3210 may first block a power of components not forming a backup path in a data backup operation and may perform the data backup operation. In other words, when the power-off event occurs, the memory controller 3210 may block a power or a clock signal to components except for those in the data backup path. The memory controller 3210 may set an interleaving manner of the nonvolatile memory 3220 to a manner for minimum power consumption.

According to an exemplary embodiment of the inventive concept, when a power-off event of a storage device occurs, it is possible to efficiently use a power of an auxiliary power supply and to increase the reliability of backup data.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A data backup method of a storage device which includes a storage controller, a buffer memory, and a plurality of nonvolatile memory devices, the method comprising:

detecting a power-off event of an external power provided to the storage device;

deactivating a host interface of the storage controller and a direct memory access (DMA) engine of the storage controller in response to the detection of the power-off event, wherein the DMA engine performs data transmission with a host;

moving data stored in the buffer memory to a cache memory of the storage controller;

blocking or deactivating a power of the buffer memory after moving the data to the cache memory;

blocking or deactivating a power of a buffer controller controlling the buffer memory after the power of the buffer memory is blocked or deactivated;

changing a fully interleaving mode of the plurality of nonvolatile memo devices to a partial interleaving mode to reduce bandwidth;

blocking or deactivating a power of an unselected one of the plurality of nonvolatile memory devices in the partial interleaving mode; and programming the data stored in the cache memory to a selected one of the plurality of nonvolatile memory devices in the partial interleaving mode for a backup operation of the data, wherein the host interface, the DMA engine, the buffer memory, the buffer controller and the unselected one of the plurality of nonvolatile memory devices are sequentially shut down according to the backup operation.

2. The method of claim 1, wherein, when the power-off event is detected, a device power of the storage device is changed from the external power to a power of an auxiliary power supply.

3. The method of claim 1, wherein the deactivating of the host interface includes:

deactivating a clock generator generating a clock signal for driving the host interface.

4. A storage device which includes an auxiliary power supply, comprising:

a power loss prevention circuit for monitoring an external power to detect a power-off event, generating a power-off detection signal when the power-off event is detected, and selecting the auxiliary power supply as a device power when the power-off event is detected;

a plurality of nonvolatile memory devices provided in the storage device;

a buffer memory for temporarily storing data exchanged between the plurality of nonvolatile memory devices and a host; and a storage controller, wherein, in response to the power-off detection signal, the storage controller moves data stored in the buffer memory to a working memory of the storage controller, wherein the storage controller deactivates a host interface and a direct memory access (DMA) engine and then blocks or deactivates a power of the buffer memory after the data has been moved from the buffer memory to the working memory, wherein the storage controller programs the data stored in the working memory to at least one of the plurality of nonvolatile memory devices, wherein the storage controller includes:

a central processing unit for performing a backup operation in response to the power-off detection signal;

a buffer controller for controlling the buffer memory in response to the central processing unit; and a flash interface connected with the plurality of nonvolatile memory devices in channel units and accessing the plurality of nonvolatile memory devices in a channel or way interleaving manner, wherein, after the data are moved from the buffer memory, the central processing unit blocks or deactivates a power of the buffer controller, wherein the flash interface changes a fully interleaving mode of the plurality of nonvolatile memory devices to a partial interleaving mode to reduce bandwidth in the backup operation, wherein the central processing unit blocks or deactivates a power of an unselected one of the plurality of nonvolatile memory device in the partial interleaving mode;

wherein the central processing unit programs the data stored in the working memory to a selected one of the plurality of nonvolatile memory devices in the partial interleaving mode for the backup operation, wherein the host interface, the DMA engine, the buffer memory, the buffer controller and the unselected one of the plurality of nonvolatile memory devices are sequentially shut down according the backup operation.

5. The storage device of claim 4, wherein the storage controller further includes:

the DMA engine for controlling a DMA operation with the host, and wherein the central processing unit deactivates the DMA engine together with the host interface.

6. The storage device of claim 4, wherein the host interface further includes:

a clock generator for providing a clock signal for communication with the host, and wherein the central processing unit turns off the clock generator and deactivates the host interface.

7. The storage device of claim 4, wherein the data moved from the buffer memory is provided to the at least one of the plurality of nonvolatile memory devices.

8. The storage device of claim 4, wherein, in the partial interleaving mode, a power of the unselected one of the nonvolatile memory devices is blocked or deactivated.

9. A data backup method of a storage device which performs data backup by using an auxiliary power supply when a power-off event occurs, the method comprising:

deactivating a host interface and a direct memory access (DMA) engine of a storage controller in response to the power-off event;

moving data stored in a buffer memory to a static random access memory (SRAM);

blocking or deactivating a power of the buffer memory after moving the data to the SRAM;

blocking or deactivating a power of a buffer controller for controlling the buffer memory;

changing a fully interleaving mode of a plurality of nonvolatile memory devices to a partial interleaving mode to reduce bandwidth;

blocking or deactivating a power of an unselected one of the plurality of nonvolatile memory devices in the partial interleaving mode; and programming the data stored in SRAM to a selected one of the nonvolatile memory devices in the partial interleaving mode for a backup operation of the data, wherein the host interface, the DMA engine, the buffer memory, the buffer controller and the unselected one of the plurality of nonvolatile memory devices are sequentially shut down according to the backup operation.

10. The method of claim 9, wherein, in the deactivating of the host interface, a clock generator generating a clock signal for driving the host interface is deactivated.

* * * * *